(12) United States Patent
Park et al.

(10) Patent No.: US 12,636,852 B2
(45) Date of Patent: May 26, 2026

(54) THERMOPLASTIC SHEETS AND ARTICLES WITH VARIABLE LOFTING CAPACITY

(71) Applicant: HANWHA AZDEL, INC., Forest, VA (US)

(72) Inventors: Yune Seo Park, Fenton, MI (US); Anthony J Messina, Macomb, MI (US)

(73) Assignee: Hanwha Azdel, Inc., Forest, VA (US)

( * ) Notice: Subject to any disclaimer, the term of this patent is extended or adjusted under 35 U.S.C. 154(b) by 0 days.

(21) Appl. No.: 17/018,581

(22) Filed: Sep. 11, 2020

(65) Prior Publication Data

US 2021/0146650 A1 May 20, 2021

Related U.S. Application Data

(63) Continuation of application No. 15/223,725, filed on Jul. 29, 2016, now abandoned.

(Continued)

(51) Int. Cl.
*B32B 3/26* (2006.01)
*B29C 44/02* (2006.01)
(Continued)

(52) U.S. Cl.
CPC ............... *B32B 3/26* (2013.01); *B29C 44/02* (2013.01); *B29C 44/569* (2013.01); *B29C 65/02* (2013.01); *B29C 65/48* (2013.01); *B29C 66/7212* (2013.01); *B29C 70/02* (2013.01); *B32B 5/022* (2013.01); *B32B 5/024* (2013.01); *B32B 5/18* (2013.01); *B32B 5/245* (2013.01);
(Continued)

(58) Field of Classification Search
CPC .... B32B 3/26; B32B 5/32; B32B 7/12; B32B 27/24; B32B 37/06; B32B 37/12; B29C 44/02; B29C 44/569; B29C 65/02; B29C 65/48; B29C 66/7212; B29K 2075/00
See application file for complete search history.

(56) References Cited

U.S. PATENT DOCUMENTS 4,426,470 A * 1/1984 Wessling ................. C08J 3/215
264/109
4,643,940 A * 2/1987 Shaw ..................... D21H 25/06
428/308.4

(Continued)

FOREIGN PATENT DOCUMENTS

EP 0453784 A2 * 10/1991

OTHER PUBLICATIONS

Definition of "Another" from Merriam-Webster.com (Year: 2021).*

*Primary Examiner* — Cynthia L Schaller
(74) *Attorney, Agent, or Firm* — Rhodes IP PLC; Christopher Rhodes

(57) ABSTRACT

Certain configurations are described herein of a thermoplastic sheet or article comprising a plurality of porous layers coupled to each other. In one configuration, the thermoplastic article may comprise a core layer, a first layer disposed on one surface of the core layer and a second layer disposed on another surface of the core layer. In some instances, each of the core layer, the first layer and the second layer may comprises a web of open celled structures formed by a plurality of reinforcing materials bonded together with a thermoplastic material and optionally may also include a lofting agent. The lofting capacity in different layers can be selected or tuned to provide desired properties.

20 Claims, 5 Drawing Sheets

Related U.S. Application Data

(60) Provisional application No. 62/199,767, filed on Jul. 31, 2015.

(51) Int. Cl.

| | |
|---|---|
| *B29C 44/56* | (2006.01) |
| *B29C 65/00* | (2006.01) |
| *B29C 65/02* | (2006.01) |
| *B29C 65/48* | (2006.01) |
| *B29C 70/02* | (2006.01) |
| *B32B 5/02* | (2006.01) |
| *B32B 5/18* | (2006.01) |
| *B32B 5/24* | (2006.01) |
| *B32B 5/32* | (2006.01) |
| *B32B 7/02* | (2019.01) |
| *B32B 7/12* | (2006.01) |
| *B32B 27/10* | (2006.01) |
| *B32B 27/12* | (2006.01) |
| *B32B 27/24* | (2006.01) |
| *B32B 27/40* | (2006.01) |
| *B32B 29/00* | (2006.01) |
| *B32B 29/02* | (2006.01) |
| *B32B 37/06* | (2006.01) |
| *B32B 37/12* | (2006.01) |
| *D21H 13/14* | (2006.01) |
| *D21H 13/20* | (2006.01) |
| *D21H 13/36* | (2006.01) |
| *D21H 13/50* | (2006.01) |
| *B29K 23/00* | (2006.01) |
| *B29K 75/00* | (2006.01) |
| *B29K 105/12* | (2006.01) |
| *B29K 309/08* | (2006.01) |
| *B29L 31/30* | (2006.01) |

(52) U.S. Cl.
CPC .................. *B32B 5/32* (2013.01); *B32B 7/02* (2013.01); *B32B 7/12* (2013.01); *B32B 27/10* (2013.01); *B32B 27/12* (2013.01); *B32B 27/24* (2013.01); *B32B 27/40* (2013.01); *B32B 29/007* (2013.01); *B32B 29/02* (2013.01); *B32B 37/06* (2013.01); *B32B 37/12* (2013.01); *D21H 13/14* (2013.01); *D21H 13/20* (2013.01); *D21H 13/36* (2013.01); *D21H 13/50* (2013.01); *B29K 2023/14* (2013.01); *B29K 2075/00* (2013.01); *B29K 2105/128* (2013.01); *B29K 2309/08* (2013.01); *B29K 2995/0078* (2013.01); *B29L 2031/3017* (2013.01); *B32B 2250/03* (2013.01); *B32B 2250/05* (2013.01); *B32B 2250/40* (2013.01); *B32B 2255/02* (2013.01); *B32B 2255/12* (2013.01); *B32B 2255/20* (2013.01); *B32B 2255/26* (2013.01); *B32B 2262/02* (2013.01); *B32B 2262/10* (2013.01); *B32B 2262/101* (2013.01); *B32B 2264/108* (2013.01); *B32B 2266/0278* (2013.01); *B32B 2270/00* (2013.01); *B32B 2305/022* (2013.01); *B32B 2305/08* (2013.01); *B32B 2307/102* (2013.01); *B32B 2307/3065* (2013.01); *B32B 2307/546* (2013.01); *B32B 2307/718* (2013.01); *B32B 2307/7265* (2013.01); *B32B 2307/732* (2013.01); *B32B 2307/738* (2013.01); *B32B 2398/20* (2013.01); *B32B 2419/00* (2013.01); *B32B 2605/00* (2013.01); *B32B 2607/00* (2013.01)

(56) References Cited

U.S. PATENT DOCUMENTS

| | | | |
|---|---|---|---|
| 2007/0202326 A1* | 8/2007 | Geel ..................... | B29C 70/025 |
| | | | 428/361 |
| 2008/0008869 A1* | 1/2008 | Good ........................ | B32B 5/28 |
| | | | 264/45.3 |
| 2016/0168350 A1* | 6/2016 | Tseng .................... | B32B 27/281 |
| | | | 521/60 |
| 2016/0332675 A1* | 11/2016 | Yang ................... | B32B 37/1284 |
| 2016/0375661 A1* | 12/2016 | Dalal ..................... | B32B 5/022 |
| | | | 428/171 |

* cited by examiner

100

120
110
130

200

220
210
230

300

320
310
330

400

420
410
430

500

540
520
510
530

550

540
520
510
530
560

600

700

800

840
820
810
830

900

950
940
920
910
930

1000

1005a

1005b

1100

THERMOPLASTIC SHEETS AND ARTICLES WITH VARIABLE LOFTING CAPACITY

PRIORITY APPLICATION

This application is related to, and claims priority to and the benefit of, U.S. Application No. 62/199,767 filed on Jul. 31, 2015, the entire disclosure of which is hereby incorporated herein by reference for all purposes.

TECHNOLOGICAL FIELD

This application is related to thermoplastic sheets and articles with variable lofting capacity. More particularly, certain embodiments described herein are directed to multi-layer articles with different lofting capacities in different layers.

BACKGROUND

Articles for automotive and construction materials applications typically are designed to meet a number of competing and stringent performance specifications.

SUMMARY

Certain configurations are described herein that are directed to multi-layer assemblies, and components thereof, that provide for variable lofting capacity in different layers. While certain specific configurations are described in detail below, the variable lofting capacity may arise from one or more of a thermoplastic material and/or reinforcing materials. In some instances, lofting capacity can be further tuned or selected by including an added lofting agent in addition to the thermoplastic material and/or reinforcing materials present in the layer.

In one aspect, a thermoplastic sheet comprising a core layer comprising a web of open celled structures formed by a plurality of reinforcing materials bonded together with a thermoplastic material, the core layer further comprising a lofting agent, the core layer also comprising a first surface and a second surface opposite the first surface, a first layer disposed on the first surface of the core layer, the first layer comprising a web of open celled structures formed by a plurality of reinforcing materials bonded together with a thermoplastic material, and a second layer disposed on the second surface of the core layer, the second layer comprising a web of open celled structures formed by a plurality of reinforcing materials bonded together with a thermoplastic material is provided.

In certain embodiments, a basis weight of the first layer is substantially the same (or different) as a basis weight of the second layer. In other configurations, a basis weight of the core layer is greater than the basis weight of the first layer and greater than the basis weight of the second layer. In certain instances, the reinforcing materials of the first layer, the second layer and the core layer each comprise reinforcing fibers. In some examples, the first layer comprises at least one different reinforcing fiber material than the reinforcing fiber materials of the core layer. In other examples, the reinforcing fibers of the first layer, the second layer and the core layer comprise at least one common reinforcing fiber material. In certain embodiments, the thermoplastic material in the core layer is different than the thermoplastic material in the first layer. In some examples, the thermoplastic material in the first layer and the second layer are the same. In other examples, the reinforcing materials in the first layer and the second layer are the same. In some instances, the reinforcing materials in the first layer and the second layer are the different. In certain examples, the reinforcing materials of the first layer, the second layer and the core layer each comprise reinforcing fibers. In some examples, the first layer comprises at least one different reinforcing fiber than the reinforcing fibers of the core layer. In certain embodiments, the reinforcing fibers of the first layer, the second layer and the core layer comprise at least one common reinforcing fiber type. In other embodiments, the lofting agent of the core layer comprises at least one of expandable microspheres and expandable graphite materials. In some examples, no lofting agent is present in the first layer or in the second layer. In other examples, the thermoplastic material and reinforcing materials of the first layer and the second layer are selected to permit lofting of the first layer and the second layer. In certain embodiments, the thermoplastic material and reinforcing materials of the first layer and second layer permit lofting of the first layer and the second layer at a different lofting temperature than a lofting temperature used to loft the core layer. In some examples, the sheet further comprises a first adhesive layer disposed on the first surface of the core layer between the first layer and the core layer. In other examples, the sheet further comprises a second adhesive layer disposed on the second surface of the core layer between the second layer and the core layer. In some embodiments, the first layer is directly disposed on the first adhesive layer and the second layer is directly disposed on the second adhesive layer, in which the first adhesive layer is directly disposed on the first surface of the core layer and in which the second adhesive layer is directly disposed on the second surface of the core layer. In certain configurations, the thermoplastic material of each of the core layer, the first layer and the second layer is independently selected from the group consisting of a polyolefin material, a thermoplastic polyolefin blend material, a polyvinyl polymer material, a butadiene polymer material, an acrylic polymer material, a polyamide material, a polyester material, a polycarbonate material, a polyestercarbonate material, a polystyrene material, an acrylonitrylstyrene polymer material, an acrylonitrile-butylacrylate-styrene polymer material, a polyether imide material, a polyphenylene ether material, a polyphenylene oxide material, a polyphenylenesulphide material, a polyether material, a polyetherketone material, a polyacetal material, a polyurethane material, a polybenzimidazole material, and copolymers and mixtures thereof. In some embodiments, the thermoplastic material in each of the core layer, the first layer and the second layer is independently a resin or a fiber. In other embodiments, the reinforcing materials of each of the core layer, the first layer and the second layer is independently selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In certain examples, the fibers present in each of the core layer, the first layer and the second layer comprise a diameter greater than about 5 microns and a length from about 5 mm to about 200 mm. In other examples, the sheet comprises a skin layer disposed on the first layer. In some examples, the skin layer comprises a fabric, a scrim, a film and combinations thereof. In other examples, the sheet comprises an additional skin layer disposed on the second layer. In certain configurations, the additional skin layer comprises a fabric, a scrim, a film and combinations thereof. In some configurations, the thermoplastic material present in each of the core layer, the first layer and the second layer comprises a polypropylene, the reinforcing materials present in each of the core layer, the first layer and the second layer are glass fibers and the lofting agent of the core layer comprises expandable microspheres. In other configurations, the basis weight of each of the first and second layers is about 500 gsm to about 3000 gsm and the basis weight of the core layer is about 500 gsm to about 1600 gsm.

In an additional aspect, a vehicle load floor that provides structural reinforcement is provided. In certain configurations, the vehicle load floor comprises a core layer comprising a web of open celled structures formed by a plurality of reinforcing materials bonded together with a thermoplastic material, the core layer further comprising a lofting agent, the core layer also comprising a first surface and a second surface opposite the first surface, a first layer disposed on the first surface of the core layer, the first layer comprising a web of open celled structures formed by a plurality of reinforcing materials bonded together with a thermoplastic material, and a second layer disposed on the second surface of the core layer, the second layer comprising a web of open celled structures formed by a plurality of reinforcing materials bonded together with a thermoplastic material, in which the core layer, the first layer and the second layer together provide a vehicle load floor that deflects less than about 25 mm at a weight of no more than 220 kg, e.g., 200-200 kg.

In certain embodiments, the load floor comprises a decorative layer coupled to the first layer. In some examples, the decorative layer comprises a carpet. In certain examples, the load floor comprises an adhesive layer between the decorative layer and the first layer. In additional examples, the load floor comprises a second decorative layer coupled to the second layer. In some examples, the second decorative layer comprises a carpet. In certain examples, the load floor comprises an adhesive layer between the second decorative layer and the second layer. In certain examples, the load floor deflects less than about 15 mm at 100 kg weight, or less than about 15 mm at 150 kg weight, or less than about 10 mm at 100 kg weight, or less than about 5 mm at 220 kg weight. In some embodiments, the thermoplastic material of the core layer comprises at least one similar or different thermoplastic material than the thermoplastic material present in the first layer. In certain examples, the core layer, the first layer and the second layer each comprises a void content of at least 5%. In some embodiments, the thermoplastic material of each of the core layer, the first layer and the second layer is independently selected from the group consisting of a polyolefin material, a thermoplastic polyolefin blend material, a polyvinyl polymer material, a butadiene polymer material, an acrylic polymer material, a polyamide material, a polyester material, a polycarbonate material, a polyestercarbonate material, a polystyrene material, an acrylonitrylstyrene polymer material, an acrylonitrile-butylacrylate-styrene polymer material, a polyether imide material, a polyphenylene ether material, a polyphenylene oxide material, a polyphenylenesulphide material, a polyether material, a polyetherketone material, a polyacetal material, a polyurethane material, a polybenzimidazole material, and copolymers and mixtures thereof. In certain examples, the thermoplastic material in each of the core layer, the first layer and the second layer is independently a resin or a fiber. In some embodiments, the reinforcing materials of each of the core layer, the first layer and the second layer is independently selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In certain examples, the fibers present in each of the core layer, the first layer and the second layer comprise a diameter greater than about 5 microns and a length from about 5 mm to about 200 mm. In some embodiments, the thermoplastic material present in each of the core layer, the first layer and the second layer comprises a polypropylene, and the reinforcing materials present in each of the core layer, the first layer and the second layer are glass fibers. In certain examples, the basis weight of each of the first and second layers is about 500 gsm to about 3000 gsm and the basis weight of the core layer is about 500 gsm to about 1600 gsm. In some examples, the lofting agent of the core layer comprises expandable microspheres or expandable graphite materials. In certain embodiments, the load floor comprises a carpet layer disposed on at least one of the first layer and the second layer. In some examples, the first layer is coupled to the core layer through an adhesive layer and the second layer is coupled to the core layer through an adhesive layer. In other examples, the first layer and the second layer do not include any lofting agent, and wherein the thermoplastic material and reinforcing materials of the first layer and the second layer are each selected to permit lofting of the first layer and the second layer in the absence of lofting agent in the first layer and the second layer.

In another aspect, a kit for producing a vehicle load floor, the kit comprising a core layer comprising a web of open celled structures formed by a plurality of reinforcing materials bonded together with a thermoplastic material, the core layer further comprising a lofting agent, the core layer also comprising a first surface and a second surface opposite the first surface, a first layer separate from the core layer and comprising a web of open celled structures formed by a plurality of reinforcing materials bonded together with a thermoplastic material, and a second layer separate from the core layer and the first layer and comprising a web of open celled structures formed by a plurality of reinforcing materials bonded together with a thermoplastic material, and instructions for coupling the first layer to the first surface of the core layer and for coupling the second layer to the second surface of the core layer is described.

In certain embodiments, the kit comprises a decorative layer separate from the core layer, the first layer, and the second layer. In some examples, the kit comprises an adhesive material effective to bond the first layer to the core layer. In certain examples, the first layer of the kit is the same as the second layer of the kit. In some examples, the kit comprises a skin layer. In some examples, the skin layer is selected from the group consisting of a fabric, a scrim, a film and combinations thereof. In certain embodiments, the kit comprises a second core layer, in which the second core layer comprises a web of open celled structures formed by a plurality of reinforcing materials bonded together with a thermoplastic material, the core layer further comprising a lofting agent, the core layer also comprising a first surface and a second surface opposite the first surface. In some examples, the lofting agent of the core layer is different than the lofting agent of the second core layer. In certain examples, the first core layer and the second core layer comprise the same thermoplastic material, reinforcing materials and lofting agent. In other embodiments, the basis weight of the core layer is different than the basis weight of the second core layer.

In another aspect, a method of forming a thermoplastic sheet comprising forming a core layer by combining a thermoplastic polymer, reinforcing fibers and a lofting agent in an aqueous solution, mixing the aqueous solution comprising the thermoplastic polymer, reinforcing fibers and lofting agent to disperse the reinforcing fibers and the lofting agent in the thermoplastic polymer to provide an aqueous foam dispersion, disposing the aqueous foam dispersion onto a forming element, removing liquid from the disposed aqueous foam to provide a core layer comprising a web comprising the thermoplastic polymer, the reinforcing fibers and the lofting agent, forming a first layer by combining a thermoplastic polymer, reinforcing fibers and a lofting agent in an aqueous solution, mixing the aqueous solution comprising the thermoplastic polymer, reinforcing fibers and lofting agent to disperse the reinforcing fibers and the lofting agent in the thermoplastic polymer to provide an aqueous foam dispersion, disposing the aqueous foam dispersion onto a forming element, removing liquid from the disposed aqueous foam to provide a first layer comprising a web comprising the thermoplastic polymer, the reinforcing fibers and the lofting agent, disposing the formed first layer on a first surface of the core layer, and disposing another first layer on a second surface of the core layer to provide a thermoplastic sheet is disclosed.

In certain embodiments, the method comprises heating the core layer above a softening temperature of the thermoplastic polymer of the web of the core layer prior to disposing the first layer on the first surface of the core layer. In other embodiments, the method comprises heating the core layer above a softening temperature of the thermoplastic polymer of the web of the core layer prior to disposing the first layer on the second surface of the core layer. In some examples, the method comprises disposing an adhesive layer on the first surface of the core layer prior to disposing the first layer on the first surface. In certain embodiments, the method comprises disposing an adhesive layer on the first layer prior to disposing the first layer on the first surface. In some examples, the method comprises disposing an adhesive layer on the second surface of the core layer prior to disposing the first layer on the second surface. In certain examples, the method comprises disposing an adhesive layer on the first layer prior to disposing the first layer on the second surface. In some examples, the method comprises heating the thermoplastic sheet to loft each of the core layer and the first layers. In certain embodiments, the method comprises selecting a first loft temperature to loft the first layers where the first layer lacks any lofting agent. In some examples, the method comprises selecting a second loft temperature to loft the core layer. In certain embodiments, the method comprises selecting the first loft temperature to loft the first layer without any substantial loft of the core layer. In other embodiments, the method comprises disposing a decorative layer on one of the first layers. In certain examples, the method comprises lofting the first layers disposed on the core layer using radiant heating or conduction heating. In certain embodiments, the method comprises lofting the core layer using infrared heating. In some examples, the method comprises compressing the thermoplastic sheet to reduce its overall thickness. In some embodiments, the method comprises molding the compressed thermoplastic sheet. In certain examples, the method comprises compressing the core layer prior to disposing the first layers on the core layer. In certain examples, the method comprises compressing the first layers prior to disposing the first layers on the core layer. In some examples, the method comprises disposing a skin layer on the first layer disposed on the first surface of the core layer. In certain embodiments, the method comprises disposing an additional skin layer on the first layer disposed on the second surface of the core layer.

In an additional aspect, a method of forming a thermoplastic sheet comprising forming a core layer by combining a thermoplastic polymer, reinforcing fibers and a lofting agent in an aqueous solution, mixing the aqueous solution comprising the thermoplastic polymer, reinforcing fibers and lofting agent to disperse the reinforcing fibers and the lofting agent in the thermoplastic polymer to provide an aqueous foam dispersion, disposing the aqueous foam dispersion onto a forming element, removing liquid from the disposed aqueous foam to provide a core layer comprising a web comprising the thermoplastic polymer, the reinforcing fibers and the lofting agent, forming each of a first layer and a second layer by combining a thermoplastic polymer, reinforcing fibers and a lofting agent in an aqueous solution, mixing the aqueous solution comprising the thermoplastic polymer, reinforcing fibers and lofting agent to disperse the reinforcing fibers and the lofting agent in the thermoplastic polymer to provide an aqueous foam dispersion, disposing the aqueous foam dispersion onto a forming element, removing liquid from the disposed aqueous foam to provide a first layer comprising a web comprising the thermoplastic polymer, the reinforcing fibers and the lofting agent, disposing the formed first layer on a first surface of the core layer, and disposing the formed second layer on a second surface of the core layer to provide a thermoplastic sheet is provided.

In certain embodiments, the method comprises heating the core layer above a softening temperature of the thermoplastic polymer of the web of the core layer prior to disposing the first layer on the first surface of the core layer. In some examples, the method comprises heating the core layer above a softening temperature of the thermoplastic polymer of the web of the core layer prior to disposing the second layer on the second surface of the core layer. In certain examples, the method comprises disposing an adhesive layer on the first surface of the core layer prior to disposing the first layer on the first surface. In some embodiments, the method comprises disposing an adhesive layer on the first layer prior to disposing the first layer on the first surface. In some embodiments, the method comprises disposing an adhesive layer on the second surface of the core layer prior to disposing the second layer on the second surface. In some examples, the method comprises disposing an adhesive layer on the second layer prior to disposing the second layer on the second surface. In certain examples, the method comprises heating the thermoplastic sheet to loft each of the core layer and the first layers. In some embodiments, the method comprises selecting a first loft temperature to loft the first layers where the first layer lacks any lofting agent. In certain examples, the method comprises selecting a second loft temperature to loft the core layer.

In another aspect, a method of forming a thermoplastic sheet comprising forming a core layer by combining a thermoplastic polymer, reinforcing fibers and a lofting agent in an aqueous solution, mixing the aqueous solution comprising the thermoplastic polymer, reinforcing fibers and lofting agent to disperse the reinforcing fibers and the lofting agent in the thermoplastic polymer to provide an aqueous foam dispersion, disposing the aqueous foam dispersion onto a forming element, removing liquid from the disposed aqueous foam to provide a core layer comprising a web comprising the thermoplastic polymer, the reinforcing fibers and the lofting agent, disposing a first layer on a first surface of the core layer, the first layer comprising a web of open celled structures formed by a plurality of reinforcing materials bonded together with a thermoplastic material, and disposing a second layer on a second surface of the core layer, the second layer comprising a web of open celled structures formed by a plurality of reinforcing materials bonded together with a thermoplastic material is disclosed.

In certain embodiments, the method comprises heating the core layer above a softening temperature of the thermoplastic polymer of the web of the core layer prior to disposing the first layer on the first surface of the core layer. In some embodiments, the method comprises heating the core layer above a softening temperature of the thermoplastic polymer of the web of the core layer prior to disposing the second layer on the second surface of the core layer. In some examples, the method comprises disposing an adhesive layer on the first surface of the core layer prior to disposing the first layer on the first surface. In certain examples, the method comprises disposing an adhesive layer on the first layer prior to disposing the first layer on the first surface. In some embodiments, the method comprises disposing an adhesive layer on the second surface of the core layer prior to disposing the second layer on the second surface. In certain examples, disposing an adhesive layer on the second layer prior to disposing the second layer on the second surface. In certain embodiments, the method comprises heating the thermoplastic sheet to loft each of the core layer and the first layers. In some examples, the method comprises selecting a first loft temperature to loft the first layers where the first layer lacks any lofting agent. In certain embodiments, the method comprises selecting a second loft temperature to loft the core layer.

Additional features, aspect, examples, configurations and embodiments are described in more detail below.

BRIEF DESCRIPTION OF THE FIGURES

Certain embodiments are described with reference to the accompanying figures in which.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular thickness, width or length is intended by the depictions in the figures, and relative sizes of the figure components are not intended to limit the sizes of any of the components in the figures. Where dimensions or values are specified in the description below, the dimensions or values are provided for illustrative purposes only. In addition, no particular material or arrangement is intended to be required by virtue of shading of certain portions of the figures, and even though different components in the figures may include shading for purposes of distinction, the different components can include the same or similar materials, if desired.

DETAILED DESCRIPTION

Certain embodiments are described below with reference to singular and plural terms in order to provide a more user friendly description of the technology disclosed herein. These terms are used for convenience purposes only and are not intended to limit the layers, assemblies, articles, methods and other subject matter as including or excluding certain features unless otherwise noted as being present in a particular embodiment described herein.

In certain instances, the materials described herein can be used together to provide sheets, panels, floor pans, load floors and other articles. For example, the multi-layer assembly can be used as a wall or ceiling panel, as flooring, a sub-floor or in automotive applications such as, for example, vehicle load floors or underbody floors of a vehicle. Where the assembly is used as a vehicle load floor, the load floor may be present as an underbody assembly within the vehicle cabin or may be present as or in one or more different components or areas of the vehicle, e.g., as a drawn load floor in a vehicle storage compartment in the rear of a vehicle. As noted herein, some configurations of the multi-layer assembly may be produced without the use of any cellulose or paper based materials. In other instances, the multi-layer assembly may be produced without the use of any polyurethane core component or without the use of any polyurethane whatsoever.

Figure 1:
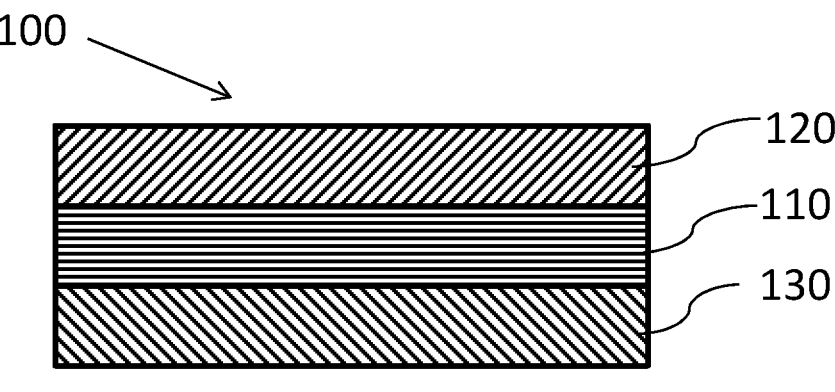
FIG. 1 is an illustration of a multi-layer assembly, in accordance with certain examples.

In certain configurations, the multi-layer assembly may comprise three or more different layers coupled to each other with one of the layers comprising a different lofting capacity than the other layers. Referring to FIG. 1, a three layer assembly 100 is shown that comprises layers 110, 120, and 130. The layer 110 is referred to in certain instances as a "core layer" as it is present between the two layers 120, 130. Various physical properties of the layers 110-130 may be the same or may be different. For example, the basis weight of any two of the layers 110-130 may be the same or may be different. In other instances, the overall thickness of the layers 110-130 may be the same or may be different. As described in more detail below, each of the layers 110-130 may comprise a thermoplastic material and/or a plurality of reinforcing materials, e.g., reinforcing fibers. By selecting the amount and/or nature of these materials to be different in two or more of the layers 110-130, the lofting capacity of the layers can be varied in the different layers, e.g., the assembly 100 has a variable lofting capacity in different layers. As used herein, lofting capacity refers to the ability to increase the overall thickness of the layer after application of a suitable stimulus such as heating. The ability to control or select the lofting capacity in each layer can provide for an assembly with reduced weight and with suitable structural rigidity and mechanical properties that can be used as panels, floor assemblies or sub floor assemblies.

In certain embodiments, any one or more of the layers 110-130 may be configured as (or used in) a glass mat thermoplastic composite (GMT) or a light weight reinforced thermoplastic (LWRT). One such LWRT is prepared by HANWHA AZDEL, Inc. and sold under the trademark SUPERLITE® mat. The areal density of such a GMT or LWRT can range from about 400 grams per square meter (gsm) of the GMT or LWRT to about 4000 gsm, although the areal density may be less than 400 gsm or greater than 4000 gsm depending on the specific application needs. In some embodiments, the upper density can be less than about 4000 gsm. In certain instances, the GMT or the LWRT may comprise lofting agent material disposed in void space of the GMT or the LWRT.

In certain examples, the LWRT typically includes a thermoplastic material and a plurality of reinforcing fibers which together form a web of open celled structures. For example, each of the layers 110-130 typically comprises a substantial amount of open cell structure such that void space is present in the layers. For example, each of the layers may independently comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, each of the layers 110-130 comprises a porosity or void content of greater than 0%, e.g., is not fully consolidated, up to about 95%. Unless otherwise stated, the reference to the layer comprising a certain void content or porosity is based on the total volume of the layer and not necessarily the total volume of the multi-layer assembly.

In certain examples, one or more of the layers 110-130 can be produced in the form of a GMT. In certain instances, the GMT can be generally prepared using chopped glass fibers, a thermoplastic material, optionally a lofting agent and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend can be used as a resin. To produce the glass mat, a thermoplastic material and reinforcing materials can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the lofting agent. In some examples, the dispersed mixture of fibers and thermoplastic material can be pumped to a head-box located above a wire section of a paper machine via a distribution manifold. The foam, not the fibers and thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material.

In certain embodiments, the high porosity present in the layers 110-130 can reduce the overall weight of the layers and can permit the inclusion of agents within the void space.

For example, lofting agents can reside in the void space in a non-covalently bonded manner. Application of heat or other perturbations can act to increase the volume of the non-covalently bonded lofting agent which in turn increases the overall thickness of the layer, e.g., the layer increases as the size of the lofting agent increases and/or additional air becomes trapped in the prepreg. If desired, flame retardants, colorants, smoke suppressants and other materials may be included in the void space of the layers 110-130. Prior to lofting, any one or more of the layers 110-130 can be compressed to reduce its overall thickness, e.g., compressed before or after the layer is coupled to one or more other layers.

In certain embodiments, the thermoplastic material of the layers described herein may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butadiene-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as copolymers, alloys and blends of these materials with each other or other polymeric materials. The thermoplastic material used to form the layers 110-130 can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the layers 110-130 can vary and illustrative amounts range from about 20% by weight to about 80% by weight, e.g., 30-70 percent by weight or 35-65 percent by weight. As noted in more detail herein, by varying the chemical composition (and/or amount) of the thermoplastic material in the different layers 110-130, the different layers 110-130 may provide for different lofting capacities even where no added lofting agent is present in the layers 110-130.

In certain embodiments, a thermoplastic material used in one of the layers 110-130 differs chemically from a thermoplastic material used in the other layers. For example, the thermoplastic material present in the layer 110 may differ chemically than the thermoplastic material present in the layer 120 or the layer 130 or both. In some instances, the thermoplastic material present in the layers 120, 130 may be the same, and the thermoplastic material present in the layer 110 may be different. In certain configurations, the thermoplastic material present in the layers 110-130 each may be chemically different. By selecting the thermoplastic material present in the layers 110-130, it is possible to provide layers with differing lofting capacities. Even though a different thermoplastic material may be present in one or more of the layers 110-130, one or more common materials may also be present in the layers 110-130. For example, the layers 110-130 may each comprise a first polyolefin and the layers 120, 130 may also comprise a second polyolefin not present in the first layer 110.

In other embodiments, a thermoplastic material used in one of the layers 110-130 may be chemically the same as a thermoplastic material present in another one of the layers, but the amount of the thermoplastic material may be different. For example, the layer 110 may comprise a first thermoplastic material present in a first amount (by weight) that is different than the amount of the first thermoplastic material present in one of the other layers 120, 130. The balance of the materials in the layers may comprise reinforcing fibers (as discussed below) or may comprise other materials such as, for example, another thermoplastic material, a lofting agent, a flame retardant or other materials as desired. Without wishing to be bound by any particular theory, by selecting the amount of a particular thermoplastic material present in a layer, the overall volume of the web of open celled structures can be changed.

In certain examples, the reinforcing materials of the layers 110-130 described herein can independently comprise glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. The fiber content in each of the layers 110-130 may independently be from about 20% to about 90% by weight of the layer, more particularly from about 30% to about 70%, by weight of the layer. Typically, the fiber content of a multilayer assembly comprising the layers 110-130 varies between about 20% to about 90% by weight, more particularly about 30% by weight to about 80% by weight, e.g., about 40% to about 70% by weight of the assembly. The particular size and/or orientation of the fibers used may depend, at least in part, on the thermoplastic polymer material used and/or the desired properties of the resulting layers 110-130. Suitable additional types of fibers, fiber sizes and amounts will be readily selected by the person of ordinary skill in the art, given the benefit of this disclosure. In one non-limiting illustration, fibers dispersed within a thermoplastic material and lofting agent to provide a layer can generally have a diameter of greater than about 5 microns, more particularly from about 5 microns to about 22 microns, and a length of from about 5 mm to about 200 mm; more particularly, the fiber diameter may be from about 5 microns to about 22 microns and the fiber length may be from about 5 mm to about 75 mm.

In certain embodiments, at least two of the layers 110-130 may comprise a different fiber material or a different fiber loading. Where different fiber materials are present, the fibers may be different fibers entirely, e.g., glass fibers in one layer and carbon fibers in another layer, or may comprise the same base material that has been modified, e.g., glass fibers in one layer and chemically treated glass fibers in another layer. In some instances, the fibers may be the same fiber material but one or more physical properties of the fibers may differ. For example, the fibers of the layer 110 may have a first diameter that differs from a diameter of the fibers present in the layer 120 even though the fiber material in the layers 110, 120 may be the same or different. In other instances, the length of the fibers in the layer 110 may differ from a length of the fibers present in the layer 120 even though the fiber material present in the layers 110, 120 may be the same or different. In additional examples, both the length and diameter of the fiber in the layer 110 may differ from a length and diameter of the fibers in the layer 120 even though the fiber material present in the layers 110, 120 may be the same or different. In yet other examples, two or more fiber types may be used in one of the layers 110, 120 and a single type of fibers may be present in the other layer. As noted herein, by selecting the amount and/or type of fibers, it is possible to provide a different lofting capacity for different layers of the assembly.

In certain embodiments, two or more of the layers 110-130 may have a different lofting profile. For example, in some instances, the layer 110 may loft at a different temperature than the layer 120. In other examples, the layer 110 may loft at a different temperature than the layer 130. In further configurations, two or more of the layers 110-130 may loft at the same temperature but the degree to which they loft may be different, e.g., the post-loft thickness of one of the layers 110-130 may be different than a post-loft thickness of one of the other layers even though all the layers are subjected to the same lofting temperature.

In some embodiments, the lofting capacity of the various layers 110-130 can be further tuned by including one or more added lofting agents. The exact type of lofting agent used in the layer can depend on numerous factors including, for example, the desired lofting temperature, the desired degree of loft, etc. In some instances, microsphere lofting agents, e.g., expandable microspheres, which can increase their size upon exposure to convection heating may be used. Illustrative commercially available lofting agents are available from Kureha Corp. (Japan). In other instances, a first lofting agent with a first average particle size and a second lofting agent with a second average particle size, different from the first average particle size, may be used. In other examples, the lofting agent may be an expandable graphite material.

In some configurations, each of the layers 110-130 may be a substantially halogen free or halogen free layer to meet the restrictions on hazardous substances requirements for certain applications. In other instances, one or more of the layers 110-130 may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in one or more of the layers 110-130 may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the layer), more particularly about 1 weight percent to about 13 weight percent, e.g., about 5 weight percent to about 13 weight percent. If desired, two different halogenated flame retardants may be added to the layers. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the layer), more particularly about 1 weight percent to about 13 weight percent, e.g., about 5 weight percent to about 13 weight percent based on the weight of the layer. If desired, two different substantially halogen free flame retardants may be added to one or more of the layers 110-130. In certain instances, one or more of the layers 110-130 described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the layer), more particularly about 1 weight percent to about 15 weight percent, e.g., about 2 weight percent to about 14 weight percent based on the weight of the layer. The flame retardant agents used in the layers described herein can be added to the mixture comprising the thermoplastic material and fibers (prior to disposal of the mixture on a wire screen or other processing component) or can be added after the layer is formed.

Figure 2:
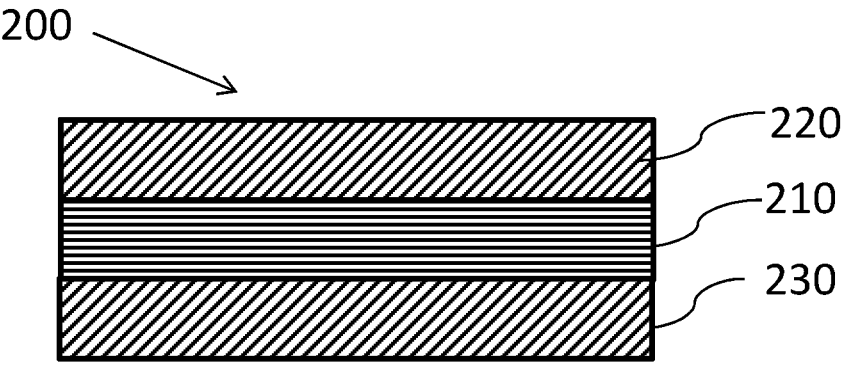
FIG. 2 is an illustration of a multi-layer assembly including a core layer with a high lofting capacity, in accordance with certain examples.

Several different illustrative layer assemblies are now described to illustrate further some of the possible configurations of a multi-layer assembly with variable lofting capacity. Additional configurations will be recognized by the person of ordinary skill in the art, given the benefit of this disclosure. Referring to FIG. 2, a composite article 200 is shown comprising layers 210, 220 and 230. In this examples, layers 220 and 230 are selected to be the same with a respective one of the layers 220, 230 disposed on a surface of the layer 210. In the configuration shown in FIG. 2, the core layer 210 is selected such that it has a higher lofting capacity than the layers 220, 230. Upon exposure to heat or other lofting stimulus, the post-loft thickness of the layer 210 will be greater than that of the layers 220, 230. For example, the thickness of the layer 210 prior to lofting may be about 1-2 mm and after lofting may be about 10-15 mm. The thickness of the layers 220, 230 prior to lofting may also be about 1-2 mm and after lofting may be about 6-8 mm. These thickness changes may occur even in the absence of any added lofting agent. For example and without wishing to be bound by any particular theory, during lofting the thermoplastic material may melt and release their hold on the reinforcing materials to permit the reinforcing materials to occupy more volume. Subsequent cooling of the thermoplastic material can result in reformation of a web of open celled structures with a larger volume than the pre-lofted web. By tuning the level of thermoplastic material and/or reinforcing materials in the layer 210, the degree to which the volume of the layer 210 can increase may be selected. In comparison, the amount of thermoplastic material and/or reinforcing materials present in the layers 220, 230 can be selected such that melting of the thermoplastic material during lofting does not result in a substantial increase in the overall volume. As the web of the layers 220, 230 reforms after lofting, the resulting post-lofted web volume is not substantially different from the pre-lofted web volume. If desired, one or more of the layers 210-230 may include an added lofting agent to further increase the overall volume. For example, the layer 210 may comprise an added lofting agent to further select the overall post-lofted volume. In some instances, enough lofting agent is present so the post-lofted layer 210 has a thickness of about 20-25 mm. In some examples, the layer 210 may comprise a polyolefin, reinforcing fibers and a lofting agent, and the layers 220, 230 may comprise a polyolefin (which can be the same or different than the polyolefin in the layer 210) and a reinforcing material. In certain configurations, the polyolefin present in each of the layers 210-230 may be polypropylene or a polyolefin copolymer comprising polypropylene. In some embodiments, the reinforcing material of each of the layers 210-230 may comprise glass fibers optionally in combination with other fibers. The exact weight percentages of the thermoplastic material and reinforcing materials in each of the layers 210-230 may vary, and illustrative weight percentages in the layers 220, 230 are about 40-60 weight percent thermoplastic material with the balance being reinforcing material. The weight percentages of materials present in the layer 210 can vary and illustrative ranges include, but are not limited to, about 45-65 weight percent thermoplastic material with the balance being reinforcing material and optionally lofting agent (which is typically present from 0.1 up to about 15 weight percent).

Figure 3:
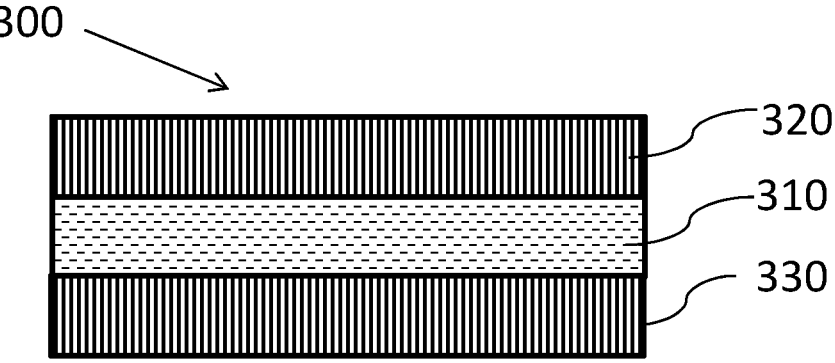
FIG. 3 is an illustration of a multi-layer assembly including a core layer with a low lofting capacity, in accordance with certain examples.

In certain examples, another configuration of a multi-layer assembly is shown in FIG. 3. An article 300 is shown as comprising layers 310, 320 and 330. In this example, layers 320 and 330 are selected to be the same with a respective one of the layers 320, 330 disposed on a surface of the layer 310. In the configuration shown in FIG. 3, the core layer 310 is selected such that it has a lower lofting capacity than the layers 320, 330. Upon exposure to heat or other lofting stimulus, the post-loft thickness of the layer 310 will be less than that of the layers 320, 330. For example, the thickness of the layer 310 prior to lofting may be about 1-2 mm and after lofting may be about 6-8 mm. The thickness of the layers 320, 330 prior to lofting may also be about 1-2 mm and after lofting may be about 10-15 mm. These thickness changes in the layers 320, 330 may occur even in the absence of any added lofting agent. For example and without wishing to be bound by any particular theory, during lofting the thermoplastic material of the layers 320, 330 may melt and release their hold on the reinforcing materials to permit the reinforcing materials to occupy more volume. Subsequent cooling of the thermoplastic material can result in reformation of a web of open celled structures with a larger volume than the pre-lofted web. By tuning the level of thermoplastic material and/or reinforcing materials in the layers 320, 330, the degree to which the volume of the layers 320, 330 can increase may be selected. In comparison, the amount of thermoplastic material and/or reinforcing materials present in the layer 310 can be selected such that melting of the thermoplastic material during lofting does not result in a substantial increase in the overall volume. As the web of the layer 310 reforms after lofting, the resulting post-lofted web volume is not substantially different from the pre-lofted web volume. If desired, one or more of the layers 310-330 may include an added lofting agent to further increase the overall volume. For example, one or both of the layers 320, 330 may comprise an added lofting agent to further select the overall post-lofted volume. In some instances, enough lofting agent is present so the post-lofted layers 320, 330 each have a thickness of about 20-25 mm. In some examples, the layer 310 may comprise a polyolefin, and reinforcing fibers, and the layers 320, 330 may comprise a polyolefin (which can be the same or different than the polyolefin in the layer 310), a reinforcing material and a lofting agent. In some instances, only one of the layers 320, 330 comprises a lofting agent. In certain configurations, the polyolefin present in each of the layers 310-330 may be polypropylene or a polyolefin copolymer comprising polypropylene. In some embodiments, the reinforcing material of each of the layers 310-330 may comprise glass fibers optionally in combination with other fibers. The exact weight percentages of the thermoplastic material and reinforcing materials in each of the layers 310-330 may vary, and illustrative weight percentages in the layers 320, 330 are about 45-65 weight % thermoplastic material with the balance being reinforcing material and optionally lofting agent (which is typically present from 0.1 up to about 15 weight percent). The weight percentages of materials present in the layer 310 can vary and illustrative ranges include, but are not limited to, about 35-60 weight percent thermoplastic material with the balance being reinforcing material.

Figure 4:
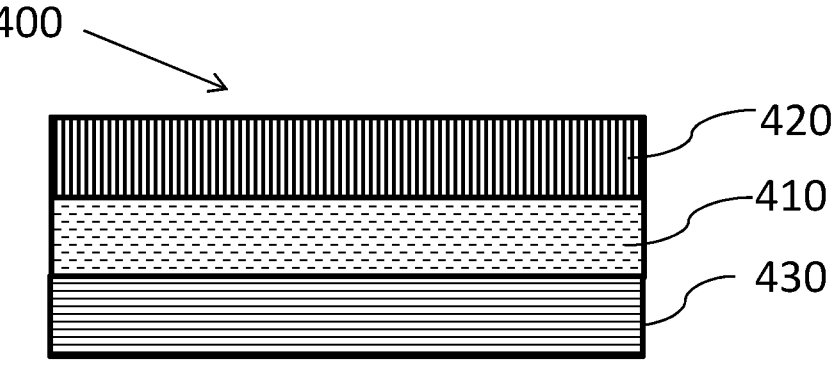
FIG. 4 is an illustration of a multi-layer assembly including three layers each with a different lofting capacity, in accordance with certain examples.

In certain embodiments, an additional configuration of a multi-layer assembly is shown in FIG. 4. An article 400 is shown as comprising layers 410, 420 and 430. In this example, each of the layers 410-430 has a different lofting capacity. In one configuration of the illustration shown in FIG. 4, the core layer 410 has the highest lofting capacity followed by the layer 420 and then the layer 430. In a different configuration, the core layer 410 has the highest lofting capacity followed by the layer 430 and then the layer 420. In other configurations, the layer 420 has the highest lofting capacity followed by the layer 410 and then the layer 430. In a different configuration, the layer 420 has the highest lofting capacity followed by the layer 430 and then the layer 410. In some configurations, the layer 430 has the highest lofting capacity followed by the layer 410 and then the layer 420. In a different configuration, the layer 430 has the highest lofting capacity followed by the layer 420 and then the layer 410. Upon exposure to heat or other lofting stimulus, the post-loft thickness of the layer with the highest lofting capacity will be greater than the other layers. For example, the thickness of the layer with the highest lofting capacity may be about 1-2 mm and after lofting may be about 10-15 mm or 20-25 mm where a lofting agent is present. The thickness of the layer with the second highest lofting capacity prior to lofting may also be about 1-2 mm and after lofting may be about 6-8 mm. The thickness of the layer with the lowest highest lofting capacity prior to lofting may also be about 1-2 mm and after lofting may be about 3-5 mm. By tuning the level of thermoplastic material and/or reinforcing materials in the various layers 410-440, the degree to which the volume of the layers can increase may be selected. In some examples, each of the layers 410-430 may comprise a polyolefin and reinforcing fibers. In certain configurations, the layer with the highest lofting capacity may also comprise a lofting agent. In some examples, the thermoplastic material of each layer may be a polyolefin such as polypropylene, but the amount of polypropylene in each of the layers 410-430 may be different. In some embodiments, the reinforcing material of each of the layers 410-430 may comprise glass fibers optionally in combination with other fibers. The exact weight percentages of the thermoplastic material and reinforcing materials in each of the layers 410-430 may vary to provide the desired lofting capacity in each of the layers 410-430.

Figure 5A:
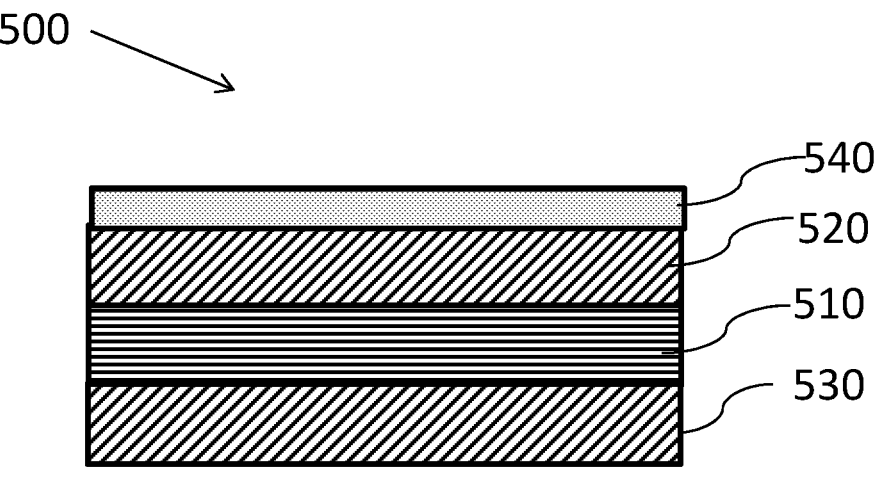
FIG. 5A is an illustration of a multi-layer assembly comprising a skin on one surface, in accordance with certain configurations.

In certain configurations, any one or more of the multi-layer assemblies described herein may comprise a skin layer disposed on one of the other layers. Referring to FIG. 5A, an illustration is shown of an article 500 that comprises layers 510-530 and a skin 540 disposed on the layer 520. If desired the skin could instead be disposed on the layer 530. For illustration purposes, the layers 510-520 are shown as being configured similar to those layers described in reference to FIG. 2, though any of the other multi-layered configurations described herein may also be used with a skin. If desired, an adhesive layer (not shown) may be present between the layer 520 and the skin 540. The skin 540 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating. In other instances, the skin 540 may comprise a limiting oxygen index greater than about 22, as measured per ISO 4589 dated 1996. Where a thermoplastic film is present as (or as part of) the skin 540, the thermoplastic film may comprise at least one of poly(ether imide), poly(ether ketone), poly(etherether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the skin 540, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the skin 540, the coating may comprise at least one of unsaturated polyurethanes, vinyl esters, phenolics and epoxies. Where an inorganic coating is present as (or as part of) the skin 540, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the skin 540, the non-woven fabric may comprise a thermoplastic material, a thermal setting binder, inorganic fibers, metal fibers, metallized inorganic fibers and metallized synthetic fibers. If desired, the skin 540 may also comprise a lofting agent as well.

Figure 5B:
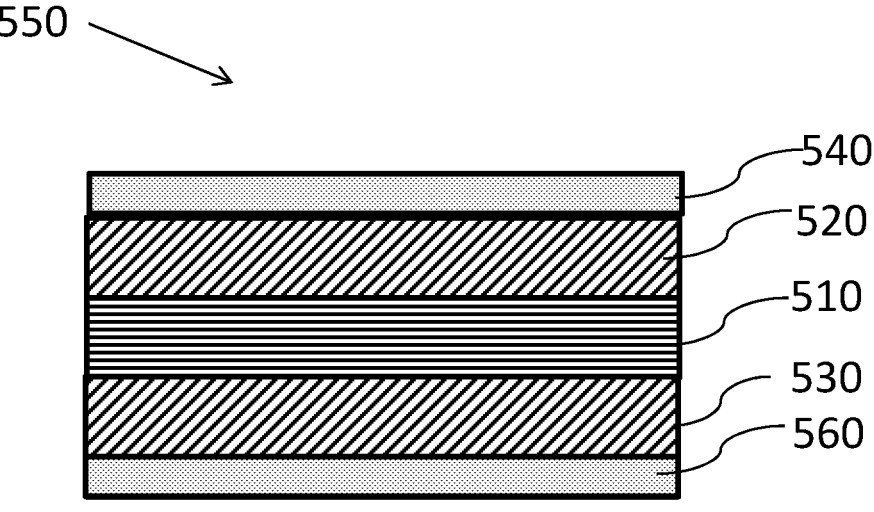
FIG. 5B is an illustration of a multi-layer assembly comprising a skin on each surface, in accordance with certain configurations.

In some examples, a second skin may be present on an opposite surface of the multi-layer assembly. Referring to FIG. 5B, a second skin 560 is shown as being present on the article 550. If desired, an adhesive layer (not shown) may be present between the layer 530 and the skin 560. The skins 540, 560 may independently comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating. In other instances, the skins 540, 560 may independently comprise a limiting oxygen index greater than about 22, as measured per ISO 4589 dated 1996. Where a thermoplastic film is present as (or as part of) the skin 540, the thermoplastic film may comprise at least one of poly(ether imide), poly(ether ketone), poly(etherether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) one or both of the skins 540, 560, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) one or both of the skins 540, 560, the coating may comprise at least one of unsaturated polyurethanes, vinyl esters, phenolics and epoxies. Where an inorganic coating is present as (or as part of) one or both of the skins 540, 560 the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) one or both of the skins 540, 560 the non-woven fabric may comprise a thermoplastic material, a thermal setting binder, inorganic fibers, metal fibers, metallized inorganic fibers and metallized synthetic fibers. If desired, one or both of the skins 540, 560 may also comprise a lofting agent as well.

Figure 6:
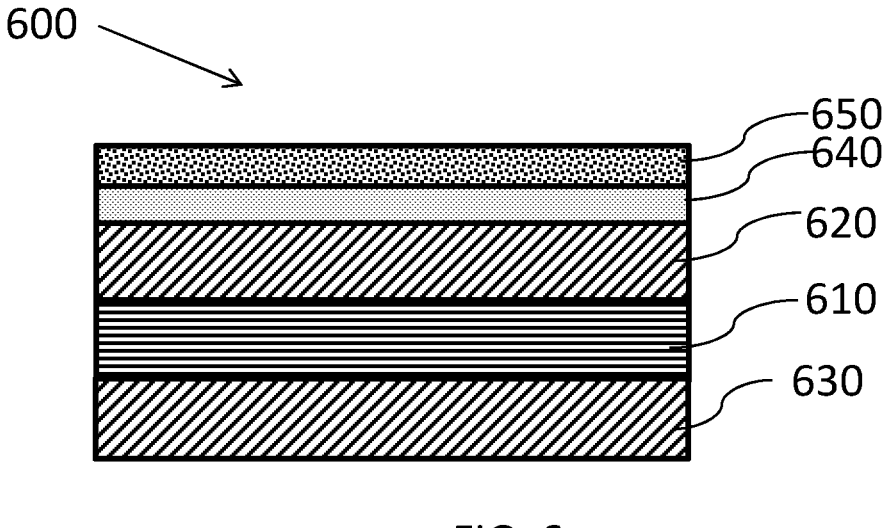
FIG. 6 is an illustration of a multi-layer assembly comprising a decorative layer on an outer surface, in accordance with certain examples.

In certain instances, a multi-layer assembly can comprise a decorative layer disposed on a skin present in the multi-layer assembly. Referring to FIG. 6, an article 600 comprises layers 610-630, a skin 640 disposed on the layer 620 and a decorative layer 650 disposed on the skin 640. As described herein, one or more of the layers 610-630 may have a variable lofting capacity, e.g., different amounts of materials and/or the presence of a lofting agent. The skin 640 may be any of the skins described in connection with the skin 540 of FIGS. 5A and 5B, e.g., films, scrims, frims, foils, a woven fabric, a coating, etc. The decorative layer 650 may be formed, e.g., from a thermoplastic film of polyvinyl chloride, polyolefins, thermoplastic polyesters, thermoplastic elastomers, or the like. The decorative layer 650 may comprise a carpet, rubber or other aesthetic covering. The decorative layer 650 may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer 650 may also be produced using spunbond, thermal bonded, spun lace, melt-blown, wet-laid, and/or dry-laid processes.

In some embodiments, the various layers and components described herein may be disposed directly onto each other without any intervening layer or material to couple the components. For example, the layers may be adjacent to each other without the use of any adhesive to couple the layers to each other. In instances where an adhesive is desirable, one or more thermoplastic polymer adhesives may be used. For example, it may be desirable to couple the skin layer or the decorative layer to the assembly using an adhesive. In some examples, the thermoplastic component of the adhesive layer may comprise a thermoplastic polymer such as, for example, a polyolefin such as a polyethylene or a polypropylene. In other instances, the thermoplastic polymer of the adhesive layer may comprise, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastic polymers for use in the adhesive layer include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. If desired, the adhesive may also comprise some thermosetting material including, but not limited to, epoxides, epoxy resins, polyesters, polyester resins, urethanes, polyurethanes, diallylphthalates, polymides, cyanate esters, polycyanurates and combinations thereof.

Figure 7:
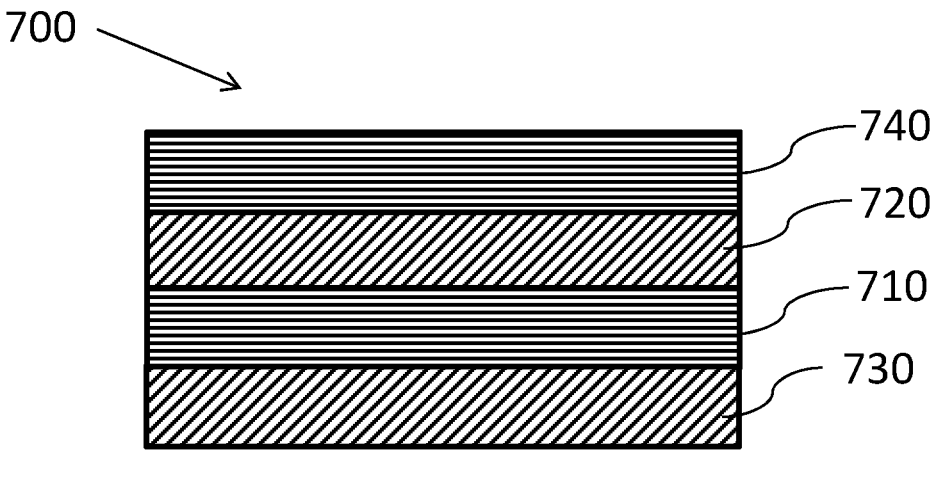
FIG. 7 is an illustration of an article comprising four layers, in accordance with certain examples.

In certain examples, the multi-layer assemblies described herein can include more than three layers, e.g., may include, four, five, six or more layers which can be lofted where at least one of the layers has a different lofting capacity than another layer. Referring to FIG. 7, an article 700 comprises layers 710-740 with layers 710, 740 being the same and layers 720, 730 being the same. In some instances, the lofting capacity of the layers 710, 740 is higher than that of the layers 720, 730, whereas in other configurations the lofting capacity of the layers 720, 730 is higher than that of the layers 710, 740. Each of the layers 710-740 can include a thermoplastic material and a reinforcing material as noted herein in connection with other layers. If desired, the layers with a higher lofting capacity may include a lofting agent or more lofting agent than the layers with a lower lofting capacity. While not shown a skin may be present on one or both surfaces of the article 700, and a decorative layer may also be present if desired.

Figure 8:
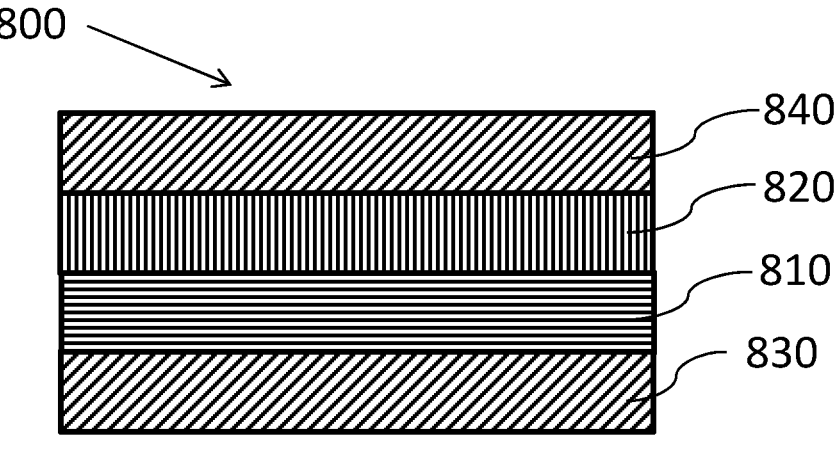
FIG. 8 is an illustration of another article comprising four layers, in accordance with certain examples.

Referring to FIG. 8, another configuration of an article 800 is shown that comprises layers 810-840 with layers 810, 820 being the same and layers 830, 840 being the same. In some instances, the lofting capacity of the layers 810, 820 is higher than that of the layers 830, 840, whereas in other configurations the lofting capacity of the layers 830, 840 is higher than that of the layers 810, 820. Each of the layers 810-840 can include a thermoplastic material and a reinforcing material as noted herein in connection with other layers. If desired, the layers with a higher lofting capacity may include a lofting agent or more lofting agent than the layers with a lower lofting capacity. While not shown a skin may be present on one or both surfaces of the article 800, and a decorative layer may also be present if desired.

Figure 9:
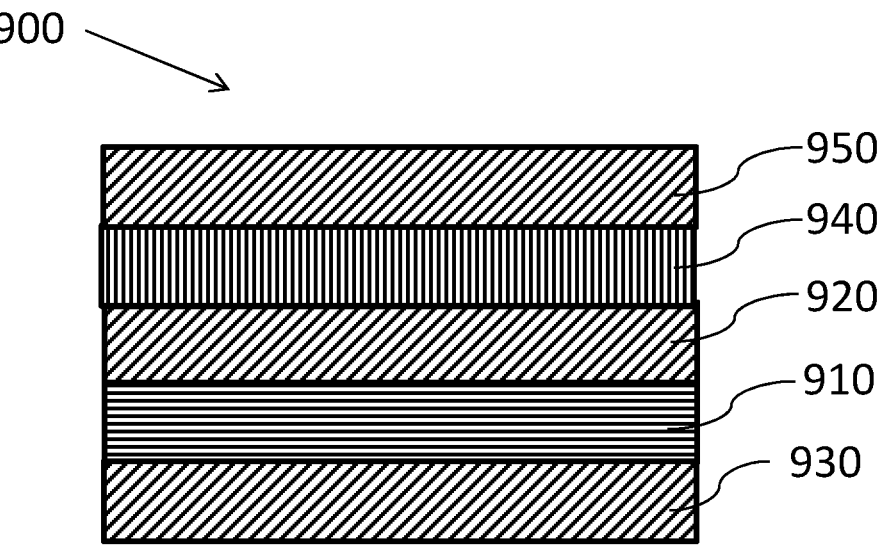
FIG. 9 is an illustration of an article comprising five layers, in accordance with certain configurations.

Referring to FIG. 9, another configuration of an article 800 is shown that comprises layers 810-850 with layers 910, 940 being the same and layers 920, 930, 950 being the same. In some instances, the lofting capacity of the layers 910, 940 is higher than that of the layers 920, 930, 950, whereas in other configurations the lofting capacity of the layers 920, 930, 950 is higher than that of the layers 910, 920. Each of the layers 910-940 can include a thermoplastic material and a reinforcing material as noted herein in connection with other layers. If desired, the layers with a higher lofting capacity may include a lofting agent or more lofting agent than the layers with a lower lofting capacity. While not shown a skin may be present on one or both surfaces of the article 900, and a decorative layer may also be present if desired.

In some embodiments, the layers may include additional materials or additives to impart desired physical or chemical properties. For example, one or more dyes, texturizing agents, colorants, viscosity modifiers, smoke suppressants, synergistic materials, lofting agents, particles, powders, biocidal agents, foams or other materials can be mixed with or added to the prepregs or the cores. In some instances, the layers may comprise one or more smoke suppressant compositions in the amount of about 0.2 weight percent to about 10 weight percent. Illustrative smoke suppressant compositions include, but are not limited to, stannates, zinc borates, zinc molybdate, magnesium silicates, calcium zinc molybdate, calcium silicates, calcium hydroxides, and mixtures thereof. If desired, a synergist material can be present to enhance the physical properties of the prepregs or cores. If desired, a synergist material that enhances lofting ability may be present. Illustrative synergist materials include, but are not limited to, sodium trichlorobenzene sulfonate potassium, diphenyl sulfone-3-sulfonate, and mixtures thereof.

In certain examples, each of the layers of the multi-layer assembly can be separately produced and then combined together to form the multi-layer assembly or layers may be formed on each other to build up a multi-layer assembly. For example, each of the layers may be separately produced in a wet laid or other process and then combined together to provide the multi-layer assembly. In producing the various layers described herein, it may be desirable to use a wet-laid process. For example, a liquid or fluid medium comprising dispersed material, e.g., thermoplastic materials, fibers and optionally lofting agent material optionally with any one or more additives described herein (e.g., other lofting agents or flame retardant agents), may be stirred or agitated in the presence of a gas, e.g., air or other gas. The dispersion may then be laid onto a support, e.g., a wire screen or other support material. The stirred dispersion may comprise one or more active agents, e.g., anionic, cationic, or non-ionic such as, for example, those sold under the name ACE liquid by Industrial Soaps Ltd., that sold as TEXOFOR® FN 15 material, by Glover Chemicals Ltd., and those sold as AMINE Fb 19 material by Float-Ore Ltd. These agents can assist in dispersal of air in the liquid dispersion. The components can be added to a mixing tank, flotation cell or other suitable devices in the presence of air to provide the dispersion. While an aqueous dispersion is desirably used, one or more non-aqueous fluids may also be present to assist in dispersion, alter the viscosity of the fluid or otherwise impart a desired physical or chemical property to the dispersion or the layer.

In certain instances, after the dispersion has been mixed for a sufficient period, the fluid with the suspended materials can be disposed onto a screen, moving wire or other suitable support structure to provide a web of laid down material. Suction or reduced pressure may be provided to the web to remove any liquid from laid down material to leave behind the thermoplastic material, lofting agent and any other materials that are present, e.g., fibers, additives, etc. The resulting web can be dried, consolidated, pressed, lofted, laminated, sized or otherwise processed further to provide a desired layer or article. In some instances, an additive or additional lofting agent material can be added to the web prior to drying, consolidation, pressing, lofting, laminating, sizing or other further processing to provide a desired layer or article. In other instances, the lofting agent may be added to the web subsequent to drying, consolidation, pressing, lofting, laminating, sizing or other further processing to provide a desired layer or article. While wet laid processes may be used, depending on the nature of the thermoplastic material, the lofting agent material and other materials present, it may be desirable to instead use an air laid process, a dry blend process, a carding and needle process, or other known process that are employed for making non-woven products.

In some configurations, the layers described herein can be produced by combining a thermoplastic material, fibers, and an optional microsphere lofting agent in the presence of a surfactant in an aqueous solution or foam. The combined components can be mixed or agitated for a sufficient time to disperse the various materials and provide a substantially homogeneous aqueous mixture of the materials. The dispersed mixture is then laid down on any suitable support structure, for example, a wire mesh or other mesh or support having a desired porosity. Water can then be evacuated through the wire mesh forming a web. The web is dried and heated above the softening temperature of the thermoplastic powder. The web is then cooled and pressed to a predetermined thickness to produce a composite sheet having a void content of between about 1 percent to about 95 percent. In an alternate embodiment, the aqueous foam also includes a binder material. In some configurations, after the web is heated above the softening temperature of the thermoplastic powder, an adhesive layer comprising a thermoplastic polymer and a thermosetting material can then be disposed on the web.

In certain examples, one or more of the layers can be produced in the form of a GMT. In certain instances, the GMT can be generally prepared using chopped glass fibers, a thermoplastic material, lofting agent and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend can be used as a resin. To produce the glass mat, a thermoplastic material, reinforcing materials, lofting agent and/or other additives can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the lofting agent. In some examples, the dispersed mixture of glass and resin can be pumped to a head-box located above a wire section of a paper machine via a distribution manifold. The foam, not the glass fiber, lofting agent or thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. When the hot web exits the dryer, a surface layer such as, for example, an adhesive layer comprising a thermoplastic polymer and a thermosetting material may be laid onto the web by passing the web of glass fiber, lofting agent, thermoplastic material and film through the nip of a set of heated rollers followed by spraying of the adhesive onto the surface of the web. If desired, additional layers such as, for example, a non-woven and/or woven fabric layer or skin layer may also be attached to one side or to both sides of the web to facilitate ease of handling the glass fiber-reinforced mat. The composite can then be passed through tension rolls and continuously cut (guillotined) into the desired size for later forming into an end product article. Further information concerning the preparation of such GMT composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

In some instances, each of the layers may be formed separately as a sheet which is then used to provide a multi-layer article. For example, a wet laid process can be used to produce a first sheet with a low lofting capacity. A wet laid process can also be used to produce a second sheet with a higher lofting capacity than the first sheet. Each sheet may be processed prior to coupling to each other. For example, each sheet may be compressed to provide for a desired thickness. Two of the first sheets can be coupled to the second sheet to provide a 3-layer assembly similar to that shown in FIG. 2. While the coupling process may vary, in some instances, one first sheet is heated to a temperature where the thermoplastic component softens. The second sheet is then disposed on the heated first sheet and additional heating is applied to soften the disposed second sheet. Another first sheet is then disposed on the heated, disposed second sheet with heating. The three layers "melt" together to couple the layers to each other. Pressure and/or temperature may be applied using processed such as molding, thermoforming, etc. to assist in coupling the sheets to each other. In other instances, one sheet may be formed onto another sheet by disposing the material onto the sheet in a liquid slurry form and permitting the water to evaporate leaving behind the thermoplastic material and reinforcing materials. Once the slurry cures, an additional sheet may be formed on top of the cured sheet using similar methods.

Figure 10:
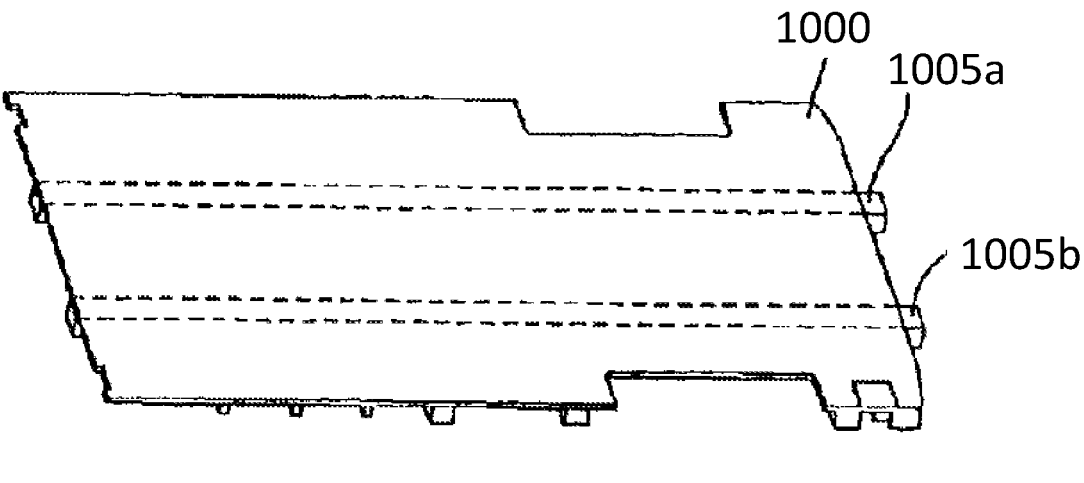
FIG. 10 is an illustration of a vehicle floor, in accordance with certain examples.

The articles described herein can be processed into a desired configuration or shape using suitable processes including, but not limited to, molding, thermoforming, drawing or other forming processes. In some instances, such processes are used to impart a desired configuration and/or to loft the various layers of the article. For example, where the article is designed to function as a vehicle floor, the floor may be shaped and/or cut in a desired manner. Referring to FIG. 10, a vehicle floor 1000 is shown as being disposed and coupled to a vehicle frame comprising components 1005_a_, 1005_b_. The floor 1000 is a generally planar structure comprising one or more of the multi-layer assemblies described herein, e.g., those shown and described in connection with FIGS. 1-9, or other similar multi-layer assemblies that will be selected by the person of ordinary skill in the art, given the benefit of this disclosure. The floor 1000 may be coupled to the frame through suitable fasteners such as bolts, screws and the like and optionally with one or more adhesives. In some instances, doors, a roof assembly and other components of the vehicle may be disposed onto the floor 1000 to provide a user cabin. If desired, a carpet, foam padding, and the like may be coupled to the floor 1000 for aesthetic or other reasons.

Figure 11:
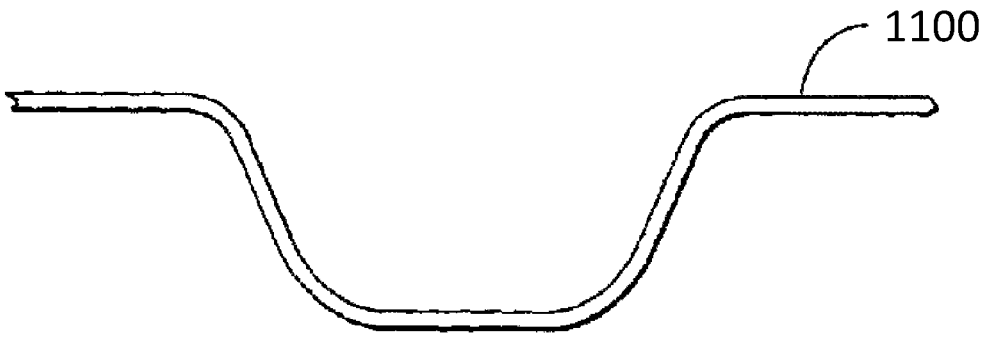
FIG. 11 is an illustration of a load floor, in accordance with certain configurations.

In some embodiments, a load floor for a rear storage compartment may be produced using the articles described herein. Referring to FIG. 11, a side view of a deep drawn article 1100 that can be used as a load floor is shown. The article 1100 is typically positioned in the rear portion of the vehicle, e.g., a rear storage portion of a sport utility vehicle or minivan, and is designed to receive components, gear, luggage, a spare tire, etc. for storage. A lid or covering (not shown) may also be present to enclose the components within the load floor 1100 and shield them from view. The load floor 1100 may comprise, for example, any of the multi-layer assemblies described herein, e.g., those shown and described in connection with FIGS. 1-9, or other similar multi-layer assemblies that will be selected by the person of ordinary skill in the art, given the benefit of this disclosure.

In some embodiments, the load floor can include structural members or slats to provide additional strength if desired. For example, one, two, three or more metal bars or members can be positioned within the load floor, e.g., in the core layer or in any other layer, to provide for additional strength. As described in more detail in the examples below, certain configurations of a load floor may provide no more than a desired amount of deflection under a selected weight, e.g., as tested using ASTM D790-10 dated Apr. 1, 2010. If a particular load floor construction deflects more than a desired amount, e.g., no more than 10 mm of deflection under a 100 kg load, then by altering the materials and/or by including structural members, to provide a load floor that meet a desired specification.

In some embodiments, the articles described herein may be configured in the form of a vehicle exterior or hull, e.g., a recreational vehicle exterior panel, a boat hull or other structural panels that may need to withstand some weight or force. The panels are particular desirable for use in higher humidity environments as the core layers are not generally sensitive to water exposure and the properties do not change to a substantial degree upon exposure to water.

In certain examples, the exact nature of the core layer and the other layers selected may depend, at least in part, on the desired acoustic properties of the article including the various layers. For example, certain configurations of the core layers described herein can provide excellent sound absorption but may not have desired sound barrier properties. A skin or other layer can be selected whose acoustic properties complement that of the core layer to provide a composite structure with good sound absorption and sound barrier properties.

In some embodiments, the core layer of the articles described herein can be water resistant. For example, in many configurations of a load floor, the core layer may be a paper based material. Exposure of the paper based material to water can greatly reduce the core layer strength and can promote mold growth. By using a core layer as described herein, water exposure does not alter the overall strength of the article.

Certain examples are described below to illustrate better some of the novel aspects and configurations described herein.

Example 1

A vehicle load floor was produced using a Superlite™ material (available from Hanwha Azdel, Inc.) as a skin and a polyurethane foam block (6 pounds per cubic feet). The Superlite™ material was present on both side of the polyurethane foam block. The overall panel thickness was 21.5 mm, the panel weight was about 5332 gsm and the panel density was 0.24 g/cm³. Under a 45 kg load (using a support width of 815 mm and a support length of 380 mm), a deflection of 1.8 mm was observed (or 0.34 mm/1000 gsm mass). At a 60 kg load, the deflection was 2.39 mm. In this Example 1 and the examples below, a coupon of the load floor was placed onto the support of specified dimensions, and a weight was placed on the span. The distance of deflection was then measured.

Example 2

Deflection values for several comparative load floors were measured to compare to Example 1. A first load floor and a second load floor each included a glass fiber reinforced polyurethane skin material and a paper honeycomb core layer. The first load floor (Comparative Load Floor #1) was 20 mm thick, weighed about 3235 gsm and had a board density of about 0.14 g/cm³. The second load floor (Comparative Load Floor #2) was about 16.6 mm thick, weighed about 3950 gsm and had a board density of about 0.25 g/cm³. A third load floor was also produced using a polypropylene blow molding process to produce a skin. The third load floor (Comparative Load Floor #3) was hollow and included a thickness of 18.6 mm, a weight of 5520 gsm and a board density of 0.3 g/cm³. The deflection results under the same 45 kg load, 60 kg load and load conditions of Example 1 are shown in Table 1.

TABLE 1

| Load Floor | Deflection under 45 kg (mm) | Deflection per 1000 gsm Mass (mm) | Deflection under 60 kg (mm) |
|---|---|---|---|
| Comparative Load Floor #1 | 2.8 | 0.87 | 3.35 |
| Comparative Load Floor #2 | 2.31 | 0.51 | 2.9 |
| Comparative Load Floor #3 | 11.5 | 2.1 | 14.5 |

In comparing the results in Table 1 to those of Example 1, less deflection was observed in the Example 1 load floor compared to any of the comparative load floors. In addition, the deflection/1000 gsm mass of the Example 1 load floor was about over 30% less than the next best comparative load floor

Example 3

Heat cycling was performed on coupons (3 inches in width and 14 inches in length) cut from each of three of the loads floors of Example 1 and 2 (Example 1 load floor and Comparative Load Floors #1 and #2). The test conditions used were 95+/−3% relative humidity at 40+/−2 deg. C. for 18 hours. A 10 kg weight was then placed on each coupon. The coupon from the load floor of Example 1 withstood the 10 kg weight with minimal deflection. The coupons from comparative load floors #2 and #3 both failed (broke) under the 10 kg weight.

Example 4

The coupon from load floor of Example 1 was tested under heavier weight to measure the deflection. At 220 kg, the deflection was measured to be 3.1 mm. After removal of the 220 kg weight, the coupon of the load floor exhibited a permanent deflection of about 0.1 mm (similar to the permanent deflection that occurred using the other weights in Examples 1-3).

Example 5

A composite panel is produced by combining two Superlite™ skins with an XL4 core (a polypropylene/glass fiber material), each of which is commercially available from Hanwha Azdel, Inc. (Forest, Va.). The weight of the Superlite™ skins varies from about 500 gsm to about 3000 gsm, and the weight of the XL4 core layer varies from about 500 gsm to about 1600 gsm. The weight of the Superlite™ skins on each side of the XL4 core layer is about the same. The exact dimensions may vary and illustrative overall dimensions include a length of about 18 inches to about 36 inches, a width of about 8 inches to about 22 inches and a thickness of about 6 mm to about 50 mm.

Example 6

A composite panel is produced by combining two Superlite™ skins with an XL4 core (all commercially available from Hanwha Azdel, Inc.). The weight of the Superlite™ skins varies from about 500 gsm to about 3000 gsm, and the weight of the XL4 core layer varies from about 500 gsm to about 1600 gsm. The weight of one Superlite™ skin on one side of the XL4 core is different than a weight of the other Superlite™ skin on the other side of the XL4 core layer. The exact dimensions may vary and illustrative overall dimensions include a length of about 18 inches to about 36 inches, a width of about 8 inches to about 22 inches and a thickness of about 6 mm to about 50 mm.

Example 7

A composite panel is produced by combining two Superlite™ skins with an XL4 core (all commercially available from Hanwha Azdel, Inc.). The weight of the Superlite™ skins varies from about 500 gsm to about 3000 gsm, and the weight of the XL4 core layer varies from about 500 gsm to about 1600 gsm. The weight of one Superlite™ skin on one side of the XL4 core is the same or different than a weight of the other Superlite™ skin on the other side of the XL4 core layer. A decorative layer, e.g., a non-woven fabric, is added to at least one of the Superlite™ skins. The exact dimensions may vary and illustrative overall dimensions include a length of about 18 inches to about 36 inches, a width of about 8 inches to about 22 inches and a thickness of about 6 mm to about 50 mm.

Example 8

A composite panel is produced by combining two Superlite™ skins with an XL4 core comprising expandable microsphere lofting agents, each of which is commercially available from Hanwha Azdel, Inc. (Forest, Va.). The weight of the Superlite™ skins varies from about 500 gsm to about 3000 gsm, and the weight of the XL4 core layer varies from about 500 gsm to about 1600 gsm. The weight of the Superlite™ skins on each side of the XL4 core layer is about the same. The exact dimensions may vary and illustrative overall dimensions include a length of about 18 inches to about 36 inches, a width of about 8 inches to about 22 inches and a thickness of about 6 mm to about 50 mm.

Example 9

A composite panel is produced by combining two Superlite™ skins with an XL4 core comprising expandable microsphere lofting agents (all commercially available from Hanwha Azdel, Inc.). The weight of the Superlite™ skins varies from about 500 gsm to about 3000 gsm, and the weight of the XL4 core layer varies from about 500 gsm to about 1600 gsm. The weight of one Superlite™ skin on one side of the XL4 core is different than a weight of the other Superlite™ skin on the other side of the XL4 core layer. The exact dimensions may vary and illustrative overall dimensions include a length of about 18 inches to about 36 inches, a width of about 8 inches to about 22 inches and a thickness of about 6 mm to about 50 mm.

Example 10

A composite panel is produced by combining two Superlite™ skins with an XL4 core comprising expandable microsphere lofting agents (all commercially available from Hanwha Azdel, Inc.). The weight of the Superlite™ skins varies from about 500 gsm to about 3000 gsm, and the weight of the XL4 core layer varies from about 500 gsm to about 1600 gsm. The weight of one Superlite™ skin on one side of the XL4 core is the same or different than a weight of the other Superlite™ skin on the other side of the XL4 core layer. A decorative layer, e.g., a non-woven fabric, is added to at least one of the Superlite™ skins. The exact dimensions may vary and illustrative overall dimensions include a length of about 18 inches to about 36 inches, a width of about 8 inches to about 22 inches and a thickness of about 6 mm to about 50 mm.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A method of forming a thermoplastic sheet comprising:
forming a porous core layer by:
combining a thermoplastic polyolefin resin material, reinforcing fibers and a lofting agent in an aqueous solution, wherein the lofting agent comprises at least one of expandable microspheres and expandable graphite materials;
mixing the aqueous solution comprising the thermoplastic polyolefin resin material, reinforcing fibers and lofting agent to disperse the reinforcing fibers and the lofting agent in the thermoplastic polyolefin resin material to provide an aqueous foam dispersion;
disposing the aqueous foam dispersion onto a moving wire screen forming element;
removing liquid from the disposed aqueous foam using a vacuum to provide a formed porous core layer comprising a web comprising the thermoplastic polyolefin resin material, the reinforcing fibers and the lofting agent;
forming a first porous layer by:
combining a thermoplastic polyolefin resin material and reinforcing fibers in an aqueous solution;
mixing the aqueous solution comprising the thermoplastic polyolefin resin material and the reinforcing fibers to disperse the reinforcing fibers in the thermoplastic polyolefin resin material to provide an aqueous foam dispersion;
disposing the aqueous foam dispersion onto a moving wire screen forming element;
removing liquid from the disposed aqueous foam using a vacuum to provide a formed first porous layer comprising a web comprising the thermoplastic polyolefin resin material and the reinforcing fibers;
forming a second porous layer by:
combining a thermoplastic polyolefin resin material and reinforcing fibers in an aqueous solution;
mixing the aqueous solution comprising the thermoplastic polyolefin resin material and the reinforcing fibers to disperse the reinforcing fibers in the thermoplastic polyolefin resin material to provide an aqueous foam dispersion;
disposing the aqueous foam dispersion onto a wire screen forming element;
removing liquid from the disposed aqueous foam using a vacuum to provide a formed second porous layer comprising a web comprising the thermoplastic polyolefin resin material and the reinforcing fibers;
disposing the formed first porous layer on a first surface of the formed porous core layer; and
disposing the formed second porous layer on a second surface of the formed porous core layer to provide a thermoplastic sheet, wherein each of the formed porous core layer, the formed first porous layer and the formed second porous layer have a lofting capacity to alter a thickness of each of the formed porous core layer, the formed first porous layer and the formed second porous layer after lofting, wherein the lofting capacity of the formed porous core layer is different than the lofting capacity of the formed first porous layer at a first loft temperature and is different than the lofting capacity of the formed second porous layer at the first temperature so a resulting overall thickness in two or more of the formed porous core layer, the formed first porous layer and the formed second porous layer is different after lofting of the thermoplastic sheet at the first loft temperature.

2. The method of claim 1, further comprising heating the formed porous core layer above a softening temperature of the thermoplastic polyolefin resin material of the web of the formed porous core layer prior to disposing the formed first porous layer on the first surface of the formed porous core layer.

3. The method of claim 2, further comprising heating the formed porous core layer above a softening temperature of the thermoplastic polyolefin resin material of the web of the formed porous core layer prior to disposing the formed second porous layer on the second surface of the formed porous core layer.

4. The method of claim 1, further comprising disposing an adhesive layer on the first surface of the formed porous core layer prior to disposing the formed first porous layer on the first surface of the formed porous core layer.

5. The method of claim 1, further comprising disposing an adhesive layer on the formed first porous layer prior to disposing the formed first porous layer on the first surface of the formed porous core layer.

6. The method of claim 5, further comprising disposing an adhesive layer on the second surface of the formed porous core layer prior to disposing the formed second porous layer on the second surface of the formed porous core layer.

7. The method of claim 5, further comprising disposing an adhesive layer on the formed second porous layer prior to disposing the formed second porous layer on the second surface of the formed porous core layer.

8. The method of claim 1, further comprising heating the thermoplastic sheet to the first loft temperature to loft the formed first porous layer.

9. The method of claim 8, wherein the formed first porous layer lacks any separate lofting agent.

10. The method of claim 8, further comprising selecting the first loft temperature to loft the formed first porous layer without any substantial loft of the formed porous core layer.

11. The method of claim 10, further comprising compressing the formed porous core layer prior to disposing the formed first porous layer and the formed second porous layer on the formed porous core layer.

12. The method of claim 11, further comprising compressing the formed first porous layer prior to disposing the formed first porous layers on the formed porous core layer.

13. The method of claim 10, further comprising disposing a skin layer on the formed first porous layer disposed on the first surface of the formed porous core layer.

14. The method of claim 10, wherein the lofting agent is expandable graphite material and wherein the thermoplastic composite sheet is heated to loft the expandable graphite material to increase a thickness of the formed porous core layer.

15. The method of claim 1, further comprising disposing a decorative layer on the formed first porous layer.

16. The method of claim 1, further comprising lofting the formed first porous layer disposed on the formed porous core layer using radiant heating or conduction heating.

17. The method of claim 16, further comprising lofting the formed porous core layer using infrared heating, conduction heating or radiant heating.

18. The method of claim 1, further comprising compressing the thermoplastic sheet to reduce its overall thickness.

19. The method of claim 18, further comprising molding the compressed thermoplastic sheet.

20. The method of claim 1, wherein each thermoplastic polyolefin material of the formed porous core layer, the formed first porous layer and the formed second porous layer is polypropylene, and the reinforcing fibers of each of the formed porous core layer, the formed first porous layer and the formed second porous layer are glass fibers.

\* \* \* \* \*